No. 632,463. Patented Sept. 5, 1899.
H. A. HOUSE, Jr.
WHEEL FOR VEHICLES.
(Application filed Apr. 25, 1899.)
(No Model.)
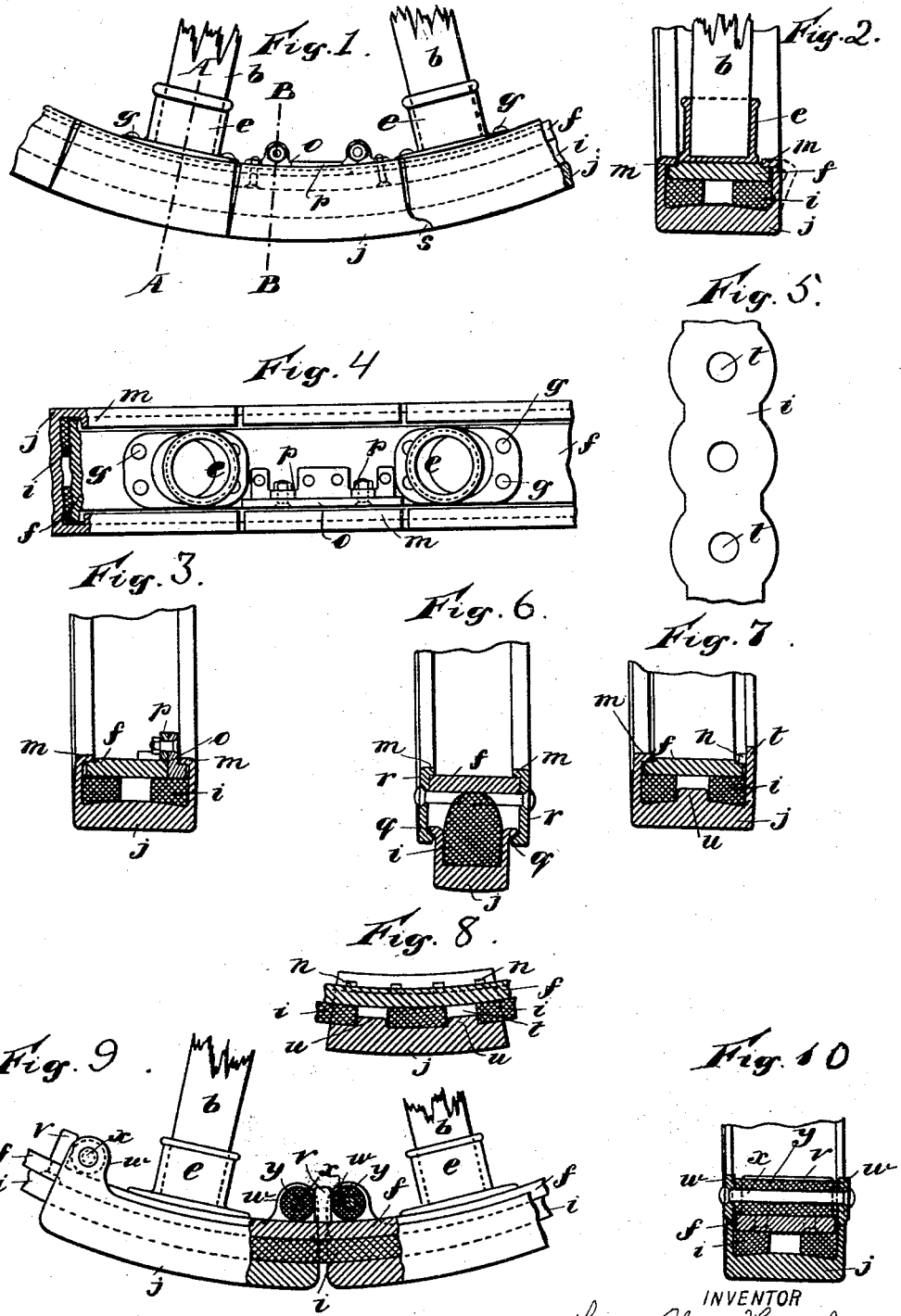
WITNESSES:
INVENTOR
Henry Alonzo House Junior
BY
ATTORNEYS

UNITED STATES PATENT OFFICE.

HENRY ALONZO HOUSE, JR., OF EAST COWES, ISLE OF WIGHT, ENGLAND.

WHEEL FOR VEHICLES.

SPECIFICATION forming part of Letters Patent No. 632,463, dated September 5, 1899.

Application filed April 25, 1899. Serial No. 714,396. (No model.)

*To all whom it may concern:*

Be it known that I, HENRY ALONSO HOUSE, Jr., engineer, a citizen of the United States of America, residing at East Cowes, Isle of Wight, England, have invented certain new and useful Improvements in Wheels for Vehicles, (for which I have applied for a patent in England, dated the 23d day of September, A. D. 1898, No. 20,184;) and I do hereby declare the following to be a full, clear, and exact description of the invention, such as will enable others skilled in the art to which it appertains to make and use the same.

The improvements which form the subject of the present invention are more especially applicable to motor-car wheels; but wheels constructed in accordance with this invention may also be used for other vehicles.

Figure 1 is a side view of a portion of a wheel with india-rubber or other suitable resilient material interposed between the inner and outer tires, as hereinafter more fully described. Figs. 2 and 3 are sections on lines A A and B B, respectively, of Fig. 1. Fig. 4 is a plan view of Fig. 1. Fig. 5 illustrates the shape of the india-rubber or other resilient material before referred to, and Figs. 6, 7, 8, 9, and 10 illustrate modifications in the tire portion of the wheel.

Similar letters of reference relate to like parts in each of the figures of the drawings.

The outer circumference of the inner tire $f$ may be surrounded with blocks of india-rubber or other like resilient material $i$, (shown in the drawings,) held in place by an outer metal tire formed of separate trough-like segments $j$, so shaped and fitted that they inclose the india-rubber blocks $i$, holding them more or less loosely to the inner tire $f$, and allow the said blocks $i$ to form a resilient cushion between the inner and outer metal tires $f$ and $j$. The outer tire segments $j$ and the india-rubber blocks $i$ are held more or less loosely in place by the inwardly-projecting lips or flanges $m$ on the sides of the trough-like segments, which flanges $m$ take under the edges of the inner tire $f$, as shown in Figs. 2, 3, and 4, or instead of the lips or flanges $m$ studs or projections may be formed on the inner surface of one side of each of the trough-like segments, as shown at $n$ in Figs. 7 and 8, the other side of such segment being provided with a lip or flange $m$, as shown in the same figures.

In order to enable the segments $j$ to be placed in position, their sides may be sprung or bent open sufficiently for the lips or flanges $m$ to pass the inner tire $f$ and afterward sprung or bent inward again, as indicated at the right-hand side of Fig. 2, for example, or a gap may be made in one portion of one side of the inner tire $f$, (see Figs. 1, 3, and 4,) so as to enable the lips or flanges $m$ on one side of each of the segments $j$ to pass into place. The segments $j$ may thus be threaded into position one after the other, and the before-mentioned gap may be filled up after the whole of the segments $j$ are in position by a keeper-piece $o$, bolted to a bracket $p$, riveted to the inner tire $f$, or the lips or flanges of the segments $j$ may in some cases project outwardly, as shown at $q$ in Fig. 6, and the whole of them be kept in position by a flanged keeper-ring $r$ on each side of the wheel.

The adjacent edges of the circumferential portion of the trough-like segments $j$ may be so shaped by halving together, as shown at $s$ in Fig. 1, for example, that the load on the wheel is transferred from one such segment to another in as continuous and regular a manner as possible.

The india-rubber or other resilient blocks $i$ are so shaped as to allow the same to be compressed, and also to prevent any rattle or jar of the metallic parts, whether the said blocks are under compression or not. Such a shape is indicated in Fig. 5, but same may be modified or varied, as desired.

Projections $u$, Figs. 5 and 6, are sometimes provided on the inner surfaces of each of the trough-like segments $j$, coincident with and entering more or less into the holes $t$ in the india-rubber or other resilient cushion $i$, in order to more or less preserve the relative positions of the segments around the circumference of the wheel, or in some cases stop-pieces $v$ may be riveted to the inner tire $f$, as shown in Figs. 9 and 10, which are respectively sectional elevation and transverse section of the tire portion of a wheel. These stop-pieces $v$ come between the trough-like segments $j$, which latter are furnished with lugs or ears $w$, carrying pins $x$, on which are threaded tubes or sleeves $y$, of india-rubber or other suitable material, which tubes or sleeves bear against the stop-pieces $v$ and tend to neutralize any jar or noise caused by the movement of the segments $j$ and also preserve the relative positions of the said segments around the circumference of the wheel.

I claim—

1. In a wheel, the combination with the inner metal tire $f$, of a plurality of outer channel-sections having their edges detachably connected to said inner tire, resilient material interposed between said inner tire and outer sections, and means for holding said sections against relative longitudinal movement, substantially as described.

2. In combination, the inner tire $f$, the outer channel-sections having portions embracing the sides of the inner tire, resilient material interposed between said inner tire $f$ and outer sections, and lugs or stops carried by the inner tire and holding said sections against longitudinal movement, substantially as described.

3. In combination, the inner tire $f$, the outer sections having inwardly-extending portions embracing the sides of said inner tire, resilient material interposed between said tire and sections, pins connecting said inwardly-extending portions, tubes or sleeves of resilient material threaded on said pins and engaging the inner side of the tire $f$, and stops carried by the tire $f$ projecting between adjacent tubes or sleeves, substantially as described.

In witness whereof I have hereunto set my hand in presence of two witnesses.

HENRY ALONZO HOUSE, JUNIOR.

Witnesses:
HERBURT H. LYTLE,
FREDERICK W. TOUSEY.